July 26, 1938.                     D. HANES                      2,125,159
                          APPARATUS FOR TESTING WELLS
                             Filed Aug. 17, 1936                 2 Sheets-Sheet 1

INVENTOR.
Dean Hanes
BY Earl Babcock
ATTORNEYS.

Patented July 26, 1938

2,125,159

UNITED STATES PATENT OFFICE 2,125,159

APPARATUS FOR TESTING WELLS

Dean Hanes, Duncan, Okla., assignor to Halliburton Oil Well Cementing Company, Duncan, Okla., a corporation of Delaware Application August 17, 1936, Serial No. 96,394

4 Claims. (Cl. 166—1)

This invention relates to a method and apparatus for testing oil wells, and more particularly to method and apparatus for indicating or recording the temperature in an oil well during the making of a test thereof.

In the United States patent to Simmons, No. 1,930,987, granted October 17, 1933, a method and apparatus for testing the productivity of formations in wells is shown and described.

It is an object of the present invention to devise means adapted to be used in connection with, or in combination with testing apparatus like that described in the patent to Simmons, mentioned above, which will indicate the temperature in a well being tested by such apparatus.

It is another object of the invention to devise a novel method for testing wells in which, not only is the sample of the formation obtained, but also the temperature of the sample when it was taken.

It is still another object of the invention to provide temperature recording apparatus adapted to be lowered into a well to record the temperature therein.

Other objects and advantages reside in certain novel features of the invention, as will be apparent from the following description taken in connection with the accompanying drawings, in which.

Figure 1:
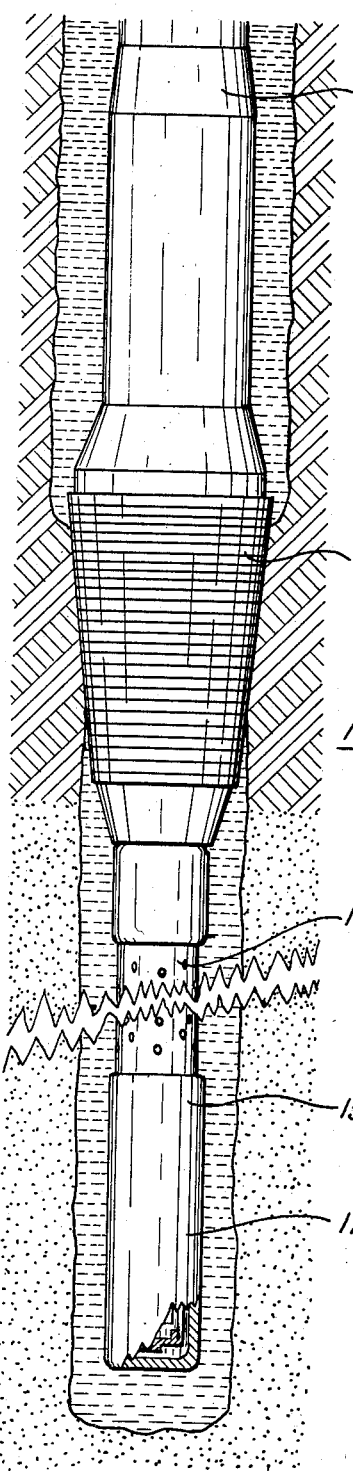
Fig. 1 is a fragmentary view in side elevation of the lower portion of a known type of testing apparatus, with a temperature recording apparatus constructed in accordance with the present invention secured thereto.
Figure 2:
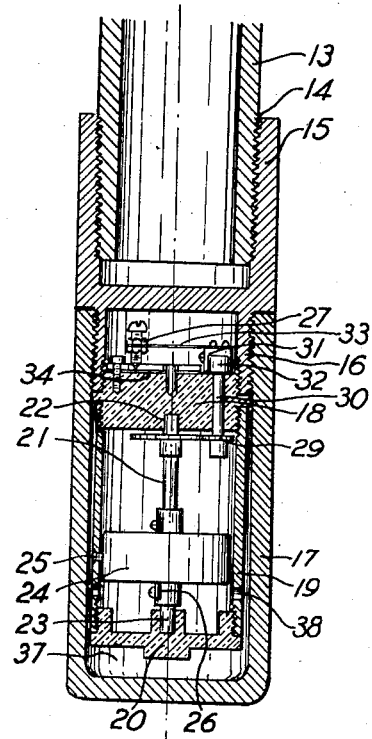
Fig. 2 is a vertical cross-sectional view of the temperature recording apparatus of Fig. 1.
Figure 3:
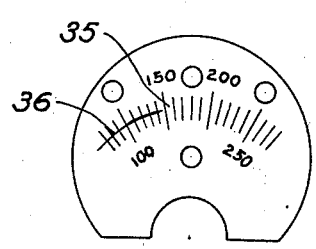
Fig. 3 is a plan view of an indicating chart used with the apparatus of Fig. 1.

Referring to the drawings in detail, and first to the embodiment of the invention shown in Figs. 1, 2 and 3, it will be seen that testing apparatus is there shown as having a main body portion 11, provided with a packer 12, and a hollow perforated pipe or strainer 13 at its lower end. The structure of the testing tool may be identical with that described in the Simmons Patent No. 1,930,987, and need not be described herein in further detail. It suffices to state that some valve means is provided within the body portion 11 for admitting drilling fluid thereinto through the strainer 13.

The exterior of the lower portion of the perforated strainer may be provided with screw threads 14 so that a steel case 15 may be secured thereto. The case 15 may have a depending cylindrical portion 16, also threaded, and adapted to be connected to a housing 17 which contains the temperature recording apparatus.

The joints between the case 15 and the housing 17, and the joint between the depended portion 16 and the plug 18 may be provided with suitable gaskets as illustrated.

The housing 17 contains temperature indicating or recording apparatus adapted to respond to temperature conditions within a well. The temperature recording apparatus is mounted upon a supporting structure consisting of a metallic block or plug 18 screw-threaded into the depending portion 16 of the case 15, an inner cylindrical housing 19 screw-threaded to the plug 18 and a bearing support 20 screw-threaded to the housing 19. A vertically extending shaft 21 is mounted for rotation in a bearing 22 in the plug 18, and a bearing 23 in the support 20.

A bimetallic element 24, preferably in the shape of a spiral, is located within the inner housing 19, and has its outer end secured thereto as by means of the attaching screw 25. The inner end of the bimetallic element is attached to the shaft 21 by means of the attaching plate 26. Thus, the arrangement is such that variations in temperature will cause the bimetallic element to expand or contract and rotate the shaft 21 in one direction or the other.

Some liquid 37 having a high boiling point may be placed within the housing 17 and the inner housing may be provided with holes 38 to permit this fluid to contact the bimetallic element.

The bimetallic element is connected to the shaft 30 through a pair of complementary adjusting blocks 31 and 32 for calibrating or adjusting the position of the stylus with respect to the bimetallic element. The stylus may be secured to the adjusting block 31 by means of a small leaf spring 33.

Beneath the stylus, a chart 34 may be secured, and this chart may be graduated as shown at 35, with indicia of temperature. As the stylus moves back and forth over the chart, it will leave a mark thereon as indicated at 36.

The apparatus described may be caused to operate as follows:

As the testing apparatus with the temperature recorder secured thereto is lowered into the well, the temperature encountered in the mud fluid of the well will vary as the different formations are passed. The contact of the mud fluid with the housing 17 will transmit heat to the housing and to the liquid 37 therein.

The liquid 37 maintains about the same temperature on the bimetallic element 24 as that prevailing outside the housing 17. Changes in temperature in successive places in the well encountered as the testing apparatus is moved through the well will thus be transmitted to the bimetallic element and cause it to bend and rotate the shaft 21. This motion is transmitted through the gear train to the stylus 27.

Under ordinary conditions of test, the maximum temperature reached will be the temperature of the lowest formation, or the bottom of the well. With the apparatus constructed as illustrated in Figs. 1, 2 and 3, the maximum temperature reached will be indicated by the end of the mark 36 made by the stylus upon the chart. Usually the stylus will merely move from a reading of low temperature on the chart up to a maximum temperature reached, and then back to a lower temperature as the testing apparatus is lowered into the well and then pulled up out of the well. Under these normal and usual conditions, the apparatus shown in Figs. 1, 2 and 3 will be sufficient to obtain the required data as to temperature in testing a well.

Figure 4:
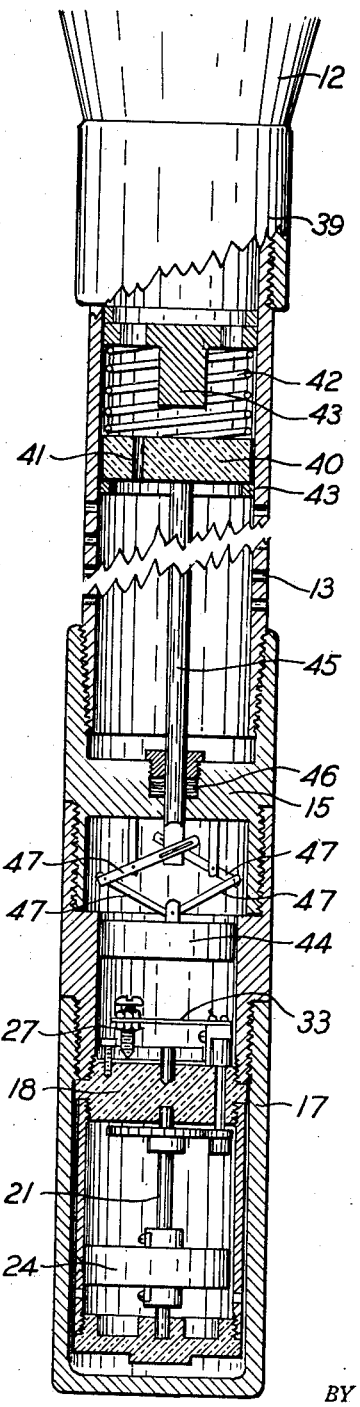
Fig. 4 is a vertical cross-sectional view of a modified form of apparatus constructed in accordance with the present invention.

If it is desired to record the temperature at the exact instant that the sample of the formation is taken by the testing apparatus, and if it is desired to record whether this temperature is the maximum encountered by the apparatus in the well, the apparatus of Fig. 4 may be employed.

In the arrangement of Fig. 4, testing apparatus similar to that illustrated in Fig. 1 is shown as having a main body 11, a packer 12 and a perforated pipe or strainer 13. The testing apparatus of Fig. 4 differs from that of Fig. 1 in that the strainer 13 has integral therewith a housing or upper cylindrical portion 39 having no perforations therein. One known type of testing tool employs a housing of this kind, and the housing contains a plug having a choke hole therein to prevent fluid from entering the testing apparatus too rapidly. In the present construction, means for choking is also provided, but instead of placing the choke hole in a fixed plug, it is located within a movable piston. Such a piston is shown at 40 in the arrangement of Fig. 4, and the choke hole therein is illustrated as consisting merely of a vertical passageway 41 therein. The piston 40 is urged downwardly by means of a coil spring 42, and movement of the piston may be limited by means of suitable stops, both above and below it, as illustrated at 43. Movement of the piston may be transmitted to a hammer 44 within the temperature recording housing by means of a piston rod 45 which passes through a stuffing box 46 in the plug 18 secured to the bottom of the strainer 13.

The temperature recording apparatus used in the embodiment of the invention shown in Fig. 4 may be identical in all respects with the arrangement shown in Figs. 1, 2 and 3, and the same reference numerals have been employed to designate the various parts. As in Fig. 3, the stylus 27 will move back and forth over the indicating chart, and the maximum temperature reached during the test will be indicated by the end of the mark 36 made upon the chart.

The hammer 44 mentioned above is connected to the case 15, by links 47 and is so located that it will strike the stylus 27. The arrangement is such that when the hammer strikes the stylus, the stylus may perforate the chart or enlarge the mark made upon the chart so that a record will be made of the temperature to which the apparatus is subjected when the hammer 44 is actuated by a piston 40.

The links 47 are preferably made of yieldable metal such as spring steel to avoid damaging the stylus when the hammer 44 strikes.

The piston 40 may be so designed as to move only in response to sudden changes in pressure of the mud fluid to which it is subjected.

As is well known to those skilled in the art, the testing apparatus is provided with a suitable valve means (not shown) to permit fluid to enter the testing apparatus. When this valve is opened there is a sudden rush of fluid into the strainer 13. For an instant this rush of fluid will lift the piston 40 against the action of the spring 42. The fluid will travel rapidly through the choke hole 41, however, and the pressure on the opposite sides of the piston 40 will soon become sufficiently equalized to allow the piston 40 to again move downwardly under the action of the spring 42, to lift the hammer 44 off of the stylus 27. The stylus will thus again be free to move over the chart and record a higher temperature, should one be encountered during the testing operation.

It will thus be seen that an apparatus has been provided which will not only record the maximum temperature in a well, but also the temperature of the mud fluid surrounding the tester when the sample of the fluid is taken.

While only two embodiments of the invention have been shown and described herein, it is obvious that various changes may be made in the arrangement and construction of the parts without departing from the spirit of the invention or the scope of the annexed claims.

I claim:

1. Apparatus for testing the formation in a well containing drilling fluid, including means for obtaining a sample of material in the well and means secured to the sampling means for recording the maximum temperature encountered by the sampling means during the time that the sampling means is in the well and means for recording the temperature of the sample at the instant that it enters the sampling means.

2. The combination with a well testing tool of temperature recording apparatus including a casing, a temperature responsive element, a stylus actuated by said temperature responsive element, and a chart located within said casing, said apparatus being self-contained and sealed and having means thereon for securing the same to said tool so that it may be lowered into a well therewith and record the maximum temperature in the well during the time that the tool and apparatus are lowered to the bottom of the well and lifted out of the well.

3. The combination with testing apparatus for obtaining a sample of material in a well of a temperature recording device, an element adapted to move when the sample of material enters the testing apparatus and mechanism for actuating said temperature recording device in response to movement of said element to obtain a record of the temperature of the sample at the instant the sample is taken.

4. The combination with testing apparatus for obtaining a sample of material in a well of a temperature recording device, said device including a temperature responsive element adapted to move in response to variations in temperature, a stylus actuated by said element and a chart so disposed with respect to the stylus as to be marked thereby, the arrangement being such that the stylus may record the maximum temperature on the chart as the apparatus is lowered into and removed from a well during the taking of a sample of fluid from the well.

DEAN HANES.